United States Patent

Bailly et al.

[11] Patent Number: 5,503,039
[45] Date of Patent: Apr. 2, 1996

[54] MOTOR VEHICLE GEARBOX

[75] Inventors: Gerhard Bailly; Ünal Gazyakan, both of Friedrichshafen, Germany

[73] Assignee: ZF Friedrichshafen AG, Friedrichshafen, Germany

[21] Appl. No.: 211,918

[22] PCT Filed: Nov. 12, 1992

[86] PCT No.: PCT/EP92/02598

§ 371 Date: Apr. 20, 1994

§ 102(e) Date: Apr. 20, 1994

[87] PCT Pub. No.: WO93/10378

PCT Pub. Date: May 27, 1993

[30] Foreign Application Priority Data

Nov. 12, 1991 [DE] Germany ............... 41 37 143.7

[51] Int. Cl.$^6$ ................................ F16H 61/04
[52] U.S. Cl. ................................................ 74/335
[58] Field of Search ................................... 74/335

[56] References Cited

U.S. PATENT DOCUMENTS

| | | | |
|---|---|---|---|
| 4,449,416 | 5/1984 | Huitema | 74/336 R |
| 4,567,969 | 2/1986 | Makita | 74/335 |
| 4,873,881 | 10/1989 | Edelen et al. | 74/335 |
| 4,957,016 | 9/1990 | Amedei et al. | 74/335 |
| 5,105,675 | 4/1992 | Langford et al. | 74/335 |
| 5,172,602 | 12/1992 | Jurgens et al. | 74/335 |

FOREIGN PATENT DOCUMENTS

| | | |
|---|---|---|
| 0150583 | 8/1985 | European Pat. Off. . |
| 2119459 | 11/1983 | United Kingdom . |

*Primary Examiner*—Dirk Wright
*Attorney, Agent, or Firm*—Davis, Bujold & Streck

[57] ABSTRACT

In a motor vehicle transmission, in particular a multi-speed synchronized countershaft transmission, each two speeds are associated with one among several gearshift sets (28, 29). It is essential that the two speeds (1st and 3rd or 2nd and 4th) associated with each gearshift set are not successive speeds. The great advantage here is that the gearshifting thus obtained is a "shifting-shifting" system which makes it possible to carry out overlapping actuating operations and thus a reduction of the time interval between gearshifts. At certain speeds, several gearshift sets or synchronizing mechanisms can be simultaneously loaded whereby the load of the individual gearshift sets (28, 29) is substantially reduced. Great advantages such as shorter gearshifting times, longer service life of the synchronizing sets and smaller gearshift sets may thus be obtained.

5 Claims, 1 Drawing Sheet

PRIOR ART

MOTOR VEHICLE GEARBOX

The invention concerns a motor vehicle transmission, especially a multi-step synchronized transmission, according to the preamble of claim 1.

In a multi-step motor vehicle transmission existing at present, two successive or adjacent speeds are respectively associated with one gearshift set. By a first gear shift set consisting of, for instance, a gearshift sleeve with or without synchronization, gearshift levers or shifting dogs, etc., the first and the second speeds, for instance, are engaged and disengaged while a second gearshift set engages and disengages the third and fourth speeds, for instance, and possibly two other speeds can be shifted via a third gearshift set. If, in such a known transmission, the next higher or lower speed is engaged, an interruption of the traction force occurs during the shifting operation, at least at low speeds, since a speed adjustment of the countershaft must be effected via the synchronizing means of the next speed, for instance, for the upshift. When changing from the first to the second speed, the synchronizing means of the second speed must effect a braking of the corresponding gear and thus of the whole countershaft so as to make possible the engagement. As result of this, a relatively severe wear (high load) of the gearshift sets takes place, shortening the service life thereof. Besides, an increased synchronization period is needed whereby a long interruption of the traction force results due to the time interval between gearshifts which may originate in the control from the thrust operations during the gear-selection process and from dead periods. To prevent such severe wear, for instance, the synchronizing sets must be made relatively large.

The problem to be solved by the invention is to provide a motor vehicle transmission of the above mentioned kind which makes possible substantially improved gearshifting properties combined with longer duration, especially of the synchronizing means, and practical improvements.

This problem is solved by a motor vehicle transmission which, according to the invention, has the features of claim 1. The sub-claims contain other advantageous embodiments.

Accordingly, a novel gear arrangement is obtained, that is, the two speeds associated with respective gearshift sets are not successive speeds. Thus, for instance, speeds 1 and 3 are actuated by a first gearshift set and speeds 2 and 4 by a second gearshift set, etc. This affords the possibility, when changing speed for instance from the first to the second or from the second to the third, of utilizing the separate controllability of the gearshift devices for reducing the time interval between gearshifts, since adjacent speeds are actuated or shifted by different gearshift sets or gearshift devices.

It is advantageous for this that an actuating means, driven and controlled independently of the actuating means of the remaining gearshift sets, be associated with each gearshift set. For this purpose, any actuating means known per se having different energies such as hydraulic, pneumatic or electric devices can obviously be used. But in multi-step gearshift transmissions existing at present, the electric power supply existing in each vehicle is being increasingly used as source of energy, in addition the trend being toward the electronic control of the driving operations. Therefore, it is especially advantageous to use a mechanism controlled and actuated by electrical power such as an electromotor combined with an electronic control as an actuating means. For coverting the rotation movement, obtained by the electromotor and controlled in relation to the torque and direction of rotation, to a translatory gearshift movement any conveniently designed device which makes such conversion possible can be used. It is thus possible to use, for instance, a spatial cam transmission like threaded spindle or ball and socket threaded spindle combined with a corresponding nut or a rack and pinion device, etc. Said actuating means makes very precise control of the translatory rotary movements for the gearshift sets of the transmission possible.

By virtue of the possibility of operating and controlling the actuating means independently of each other, the gearshift operations can be controlled so as to bring about an overlapping actuation of the converters and thus of the gearshift sets. This reduces the time intervals between gearshifts. This can be advantageously done especially by the fact that the synchronizing means of several gearshift sets can be simultaneously loaded. This is always possible when at least a higher (lower) speed still is present when upshifting (downshifting). When a shift is made, for instance, from the first to the second speed, it is possible at the same time, by actuating the gearshift set for the second speed, to load also the gearshift set of the third speed in order to reduce the velocity of the countershaft. Due to the braking or bringing into contact of the gearshift set of the third speed in addition to that of the second speed which is engaged, the load of the individual loaded gearshift sets diminishes. This brings considerable advantages such as shorter gearshift times, a longer service life of the gearshift sets and the possibility of using smaller gearshift sets whereby a very economic design is altogether obtained.

Compared to the "selection shifting" of the prior art, by using the gearshift system of the invention, generally designated as a "shifting-shifting" system, overlapping gearshifts and thus a reduction of the time intervals between gearshifts become possible together with other related advantages.

The invention is explained in detail herebelow with the aid of an embodiment compared to an embodiment according to the prior art and with reference to the drawings. In the drawings.

Figure 1:
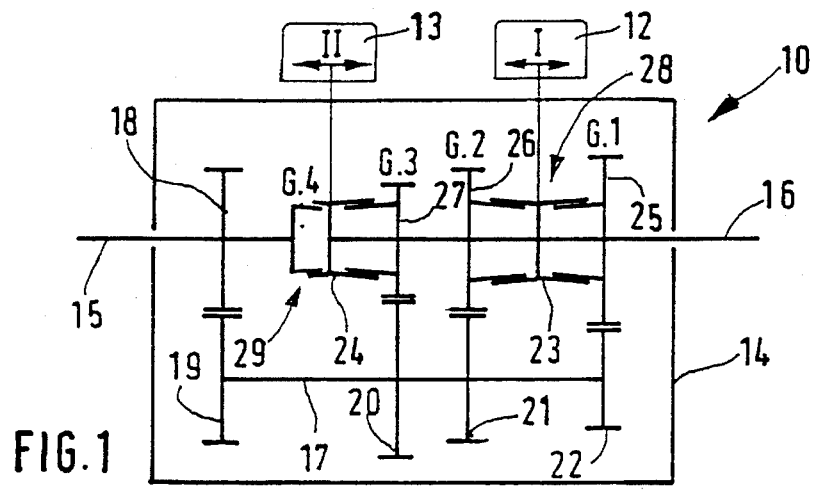
FIG. 1 is a diagrammatic illustration of a four-speed transmission according to a known embodiment/gear arrangement.
Figure 2:
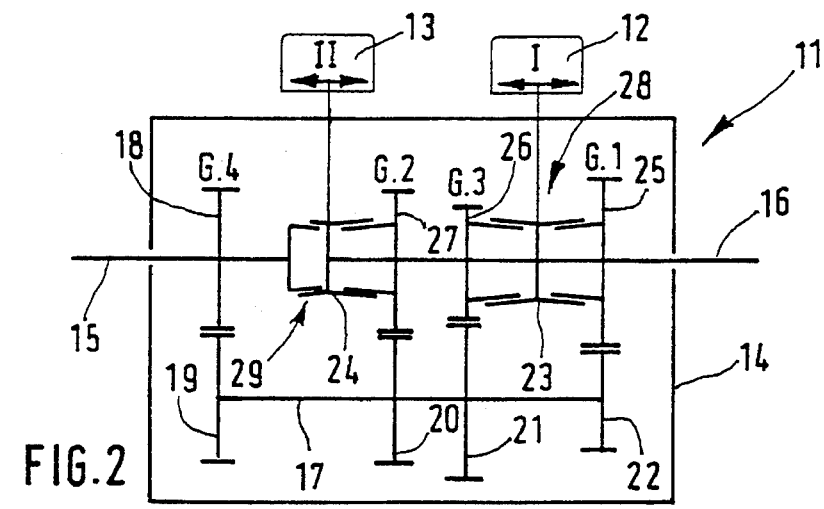
FIG. 2 is a diagrammatic illustration of a four-speed transmission with the gear arrangement according to the invention.

The motor vehicle transmission 10 of the prior art shown in FIG. 1 is a multi-step synchronized countershaft transmission (four speeds) of a classical construction from which the transmission 11 of the invention, diagrammatically shown in FIG. 2, differs only by the arrangement of the gears in relation to the actuating means 12, 13.

Thus, in the arrangement of FIG. 1 according to the prior art, two successive speeds are associated with each actuating means 12, 13, that is, the actuating means 12 operates the first and second speeds while the third and fourth speeds are actuated by the actuating means 13.

In the transmission of FIG. 2, according to the invention, non-adjacent speeds are respectively associated with one actuating means 12, 13, that is, the first and second speeds with the first actuating means 12 while the second actuating means 13 operates the second and fourth speeds.

Both the transmission known already and the transmission which is the object of the invention fundamentally consist of a housing 14 having one input shaft 15, situated therein, co-axially with an output shaft 16 to which is added paraxially offset a countershaft 17. The rotary movement assumed by the input shaft 15 is transmitted via the fixed gears 18 and 19 to the countershaft 17 upon which are provided, depending on the number of speeds, additional gears 20, 21 and 22 corresponding to speeds one through three. The fourth speed is obtained by direct coupling of the input shaft 15 with the output shaft 16.

Gearshift sleeves 23 and 24, operatively connected with the respective actuating means 12 and 13, are non-rotatably but axially displaceably provided on the output shaft 16 and the idle gears 25, 26 and 27 for the first, second and third speeds, respectively, are additionally situated on the output shaft 16 and each operatively connected with the respective gears 22, 21 and 20 of the countershaft 17. A gearshift set 28 or 29, each consisting of the corresponding gearshift sleeve 23 or 24, a part provided on the corresponding idle gear and on the input shaft 15 and the respective synchronizing means, is associated with each pair of gears.

Herebelow the operations of the transmission, according to the invention with the special help of the illustration of FIG. 2, are described.

In the illustrations on FIGS. 1 and 2, both actuating means 12 and 13 are in a neutral position, that is, no speed is engaged. Upon driving the vehicle, the first speed is engaged via the actuating means 12 whereby the transmission of movement or force occurs from the input shaft 15 to the output shaft 16 via the gear pair 18, 19, the countershaft 17, the gear pair 22, 25, the right coupling and synchronizing means of the gearshift set 28 and the gearshift sleeve 23.

If a shift from first to second speed is now desired, the gearshift sleeve 23 is disengaged from the idle gear 25 of the first speed by the actuating means 12, for instance, after control of the corresponding engine and of the linear device of the actuating means (not shown here) and is brought to the neutral position shown in the drawing. Simultaneously or shortly thereafter, the gearshift sleeve 24 is moved, via the second actuating means 13, away from its neutral position toward the idle gear 27 of the second speed. At the same time the synchronizing means of the gearshift set 29 begins to grip and effects a speed adjustment of the gear 27 with the gearshift sleeve 24 or the output shaft 16 until the corresponding clutch gears can be brought to engagement.

At the same time, with the beginning of the gearshift movement by the actuating means 13, the possibility of moving the actuating means 12 from the neutral position assumed, after disengagement from the first speed, to the idle gear 26 of the third speed exists. Thereby the gearshift set 28 is loaded and likewise contributes to the speed adjustment of the countershaft. By virtue of the practically simultaneous loading of the two gearshift sets 28 and 29 of the second and third speeds, the necessary loading of each one of the gearshift sets becomes considerably reduced whereby the constructional cost thereof accordingly can be kept lower.

The same overlapping actuation of both actuating means 12, 13 can be accomplished when shifting from the second to the third speed, taking up for support of the gearshift set 28 when the third speed is engaged via the actuating means 12 of the third speed, the gearshift set 29 of the fourth speed by actuation thereof via the actuating means 13.

In the same manner, when downshifting from the fourth to the third speed or from the third to the second speed, the gearshift set of the second or of the first speed, respectively, can be used as support.

Figure 3:
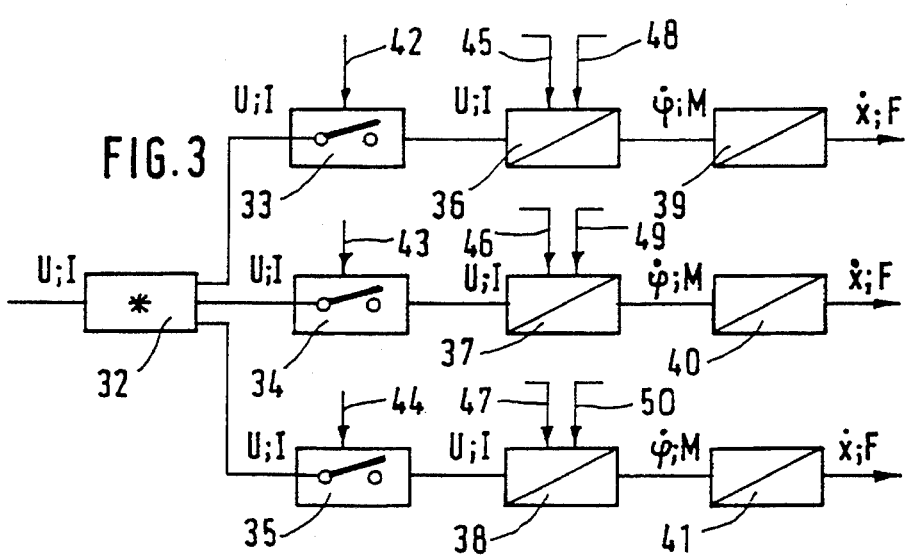
FIG. 3 is a basic operational structure of the gearshifting system of a motor vehicle transmission of the invention according to FIG. 2.

The basic operational structure of a gearshift system for the transmission according to the invention, shown in FIG. 3, is designed for a six-speed transmission and not for a four-speed transmission like in FIGS. 1 and 2. But it can be clearly understood that in a four-speed transmission as there are only two gearshift sets only two branches are needed.

The basic operational structure shown takes into consideration that:

a. the electric energy must be converted to mechanical energy, b. a translatory adjusting movement must be produced, c. the adjustment movement must be produced in several, spatially different places and be available separately of each other, d. the adjusting movement must be reversible, e. the gearshift mechanism must be disengageable and engageable, f. the actual adjusting position must be recognizable/detectable by an electric signal, and g. the adjusting movement must be controllable and regulatable (regulating distance, force).

From the diagram it is to be understood that the electric energy (U, I) used in 32, which is for branching, is divided, for instance, by means of an electric clamping device into a number of branches corresponding to the number of actuating means. In each branch is effected, at 33, 34, 35, a coupling/uncoupling by means, for instance, an adequate actuator which processes the input/output signals 42, 43, 44. In a further development, a conversion occurs (U, I in ρ, M) at 36, 37 or 38 by a respective electromotor, there simultaneously flowing in a torque control 45, 46 and 47 and a control 48, 49 and 50 of the direction of rotation. The rotary movements obtained hereby are then respectively converted by conversion (ρ, M in ẋ, F), for instance, via a linear device such as threaded spindle with a nut, or a spatial cam gear transmission, all of which are diagrammatically represented by 39, 40, 41, in a corresponding translatory adjusting movement for the corresponding actuating means 12 or 13. Consequently, as already mentioned in the beginning, a separate control takes place for each actuating means which makes an overlapping activity of the actuating means possible and thus of the gearshift sets.

List of Reference Numerals

10 motor vehicle transmission of the prior art
11 motor vehicle transmission of the invention
12 first actuating means
13 second actuating means
14 housing
15 input shaft
16 output shaft
17 countershaft
18 gear
19 gear
20 gear
21 gear
22 gear
23 gearshift sleeve
24 gearshift sleeve
25 idle gear 1st speed
26 idle gear 2nd speed
27 idle gear 3rd speed
28 gearshift set
29 gearshift set
32 branching (clamp)
33 coupling/uncoupling (switches)
34 coupling/uncoupling 35 coupling/uncoupling
36 converting (electromotor)
37 converting (electromotor)
38 converting (electromotor)
39 converting (linear device)
40 converting (linear device)
41 converting (linear device)
42 in/output signal
43 in/output signal
44 in/output signal
45 torque control
46 torque control
47 torque control
48 control of direction of rotation
49 control of direction of rotation
50 control of direction of rotation

We claim:

1. A synchronized countershaft motor vehicle transmission comprising:

a plurality of gearshift sets (28, 29) each having a synchronizing device;

a plurality of speeds (1 and 3 or 2 and 4) adjacently associated with each of said plurality of gearshift sets (28, 29), with successive speeds of said transmission being associated with different ones of said plurality of gearshift sets (28, 29); and an actuating device (12, 13) being associated with each said gearshift set (28, 29) for engaging a desired one of said adjacently associated speeds;

wherein each said actuating device (12, 13) is controlled and operated independently of one another in a manner such that the synchronizing devices of said plurality of gearshift sets (28, 29) are simultaneously loaded.

2. A synchronized countershaft motor vehicle transmission comprising:

a plurality of gearshift sets (28, 29) each having a synchronizing device;

a plurality of speeds (1 and 3 or 2 and 4) adjacently associated with each of said plurality of gearshift sets (28, 29), with successive speeds of said transmission being associated with different ones of said plurality of gearshift sets (28, 29); and an actuating device (12, 13) being associated with each said gearshift set (28, 29) for engaging a desired one of said adjacently associated speeds as desired;

wherein each said actuating device (12, 13) is controlled and operated independently of one another in a manner such that the synchronizing devices of said plurality of gearshift sets (28, 29) are simultaneously loaded; and each said actuating mechanism has an electromotor combined with an electronic control for facilitating control of said actuating mechanism.

3. A synchronized countershaft motor vehicle transmission comprising:

a plurality of gearshift sets (28, 29) each having a synchronizing device;

a plurality of speeds (1 and 3 or 2 and 4) adjacently associated with each of said plurality of gearshift sets (28, 29), with successive speeds of said transmission being associated with different ones of said plurality of gearshift sets (28, 29); and an actuating device (12, 13) being associated with each said gearshift set (28, 29) for engaging a desired one of said adjacently associated speeds as desired;

wherein each said actuating device (12, 13) is controlled and operated independently of one another in a manner such that the synchronizing devices of said plurality of gearshift sets (28, 29) are simultaneously loaded;

each said actuating mechanism has an electromotor combined with an electronic control for facilitating control of said actuating mechanism; and a linear device is connected to said electromotor for converting rotational movement of said electromotor into translatory gearshift movement for actuating a desired one of said gearshift sets (28, 29).

4. A synchronized countershaft motor vehicle transmission according to claim 3 wherein said linear device comprises a spatial cam gear transmission.

5. A synchronized countershaft motor vehicle transmission according to claim 3 wherein said linear device comprises a threaded spindle and a rotatable nut on said threaded spindle.

* * * * *